United States Patent [19]

Nagashima

[11] Patent Number: 5,444,846

[45] Date of Patent: Aug. 22, 1995

[54] IMAGE PROCESSING APPARATUS HAVING DIAGNOSTIC MODE

[75] Inventor: Nao Nagashima, Yokohama, Japan

[73] Assignee: Canon Kabushiki Kaisha, Tokyo, Japan

[21] Appl. No.: 175,675

[22] Filed: Dec. 30, 1993

Related U.S. Application Data

[63] Continuation of Ser. No. 866,278, Apr. 13, 1992, abandoned, which is a continuation of Ser. No. 570,972, Aug. 22, 1990, abandoned, which is a continuation of Ser. No. 257,157, Oct. 12, 1988, abandoned, which is a continuation of Ser. No. 767,196, Aug. 19, 1985, abandoned, which is a continuation of Ser. No. 396,463, Jul. 8, 1982, abandoned.

[30] Foreign Application Priority Data

Jul. 15, 1981 [JP] Japan ............................. 56-109402
Jul. 15, 1981 [JP] Japan ............................. 56-109403
Jul. 15, 1981 [JP] Japan ............................. 56-109404

[51] Int. Cl.[6] ............................................. G06F 15/16
[52] U.S. Cl. .................................. 395/163; 395/185.1; 395/650; 371/24; 364/230.4; 364/230; 364/232.9; 364/267; 364/931.44; 364/942.4; 364/265.5; 355/203
[58] Field of Search .......................... 395/162–166, 395/375, 575; 371/15.1, 17, 24; 364/200, 900; 358/406; 355/203, 204, 206

[56] References Cited

U.S. PATENT DOCUMENTS

| | | | |
|---|---|---|---|
| 3,710,324 | 1/1973 | Cohen et al. | 364/200 |
| 4,145,739 | 3/1979 | Dunning et al. | 364/200 |
| 4,162,396 | 7/1979 | Howard et al. | 371/20 X |
| 4,167,779 | 9/1979 | Sullivan et al. | 364/200 |
| 4,266,294 | 5/1981 | Daughton et al. | 371/24 |
| 4,294,536 | 10/1981 | Paxton | 355/14 C |
| 4,306,803 | 12/1981 | Donohue et al. | 355/14 C |
| 4,332,464 | 6/1982 | Bartulis et al. | 355/14 C |
| 4,375,917 | 3/1983 | Hiraike et al. | 355/14 R |
| 4,405,951 | 9/1983 | Omori et al. | 364/900 |
| 4,477,178 | 10/1984 | Furuichi et al. | 355/14 R |
| 4,477,901 | 10/1984 | Braband et al. | 371/20 X |
| 4,480,329 | 10/1984 | Gordebeke | 371/20 |

FOREIGN PATENT DOCUMENTS

| | | |
|---|---|---|
| 1468027 | 3/1977 | United Kingdom . |
| 1486329 | 9/1977 | United Kingdom . |
| 1508441 | 4/1978 | United Kingdom . |
| 1512994 | 6/1978 | United Kingdom . |
| 1531318 | 11/1978 | United Kingdom . |
| 1545850 | 5/1979 | United Kingdom . |

OTHER PUBLICATIONS

Koch and Gandhi, "Anschluss von Tastatur und Anzeige an μC–System" Elektronik 1979, 16:39–45.
Blazek, "A Microprocessor–Scanned Keyboard," Hewlett-Packard Journal, Jun. 1975, pp. 20–21.
Carusone et al., "Automatic Diagnostics In A Processor-Controlled Copier/Printer", IBM Technical Disclosure Bulletin, vol. 21, No. 11, Apr. 1979, pp. 4397–4398.
Elektronik Information 3:72, Mar. 1981.

Primary Examiner—Mark R. Powell
Assistant Examiner—Kee M. Tung
Attorney, Agent, or Firm—Fitzpatrick, Cella, Harper & Scinto

[57] ABSTRACT

An information processing method and apparatus capable of accessing the key input or display status without the use of a master computer. Key input, display, processor, and instruction devices are coupled together to save the memory capacity in a master computer and enable high-speed operation thereof. The processor is a slave device enabling the accessing of the display and key input devices in response to actuation of the instruction device.

11 Claims, 13 Drawing Sheets

FIG. 5A

| CHARACTER CODE | CHARACTER |
|---|---|
| X0000000 | 0 |
| X0000001 | 1 |
| X0000010 | 2 |
| X0000011 | 3 |
| X0000100 | 4 |
| X0000101 | 5 |
| X0000110 | 6 |
| X0000111 | 7 |
| X0001000 | 8 |
| X0001001 | 9 |
| X0001010 | A |
| X0001011 | b |
| X0001100 | C |
| X0001101 | d |
| X0001110 | E |
| X0001111 | F |

FIG. 5B

| CHARACTER CODE | CHARACTER |
|---|---|
| X0010000 | H |
| X0010001 | J |
| X0010010 | L |
| X0010011 | n |
| X0010100 | o |
| X0010101 | P |
| X0010110 | q |
| X0010111 | r |
| X0011000 | U |
| X0011001 | u |
| X0011010 | y |
| X0011011 | _ |
| X0011100 | − |
| X0011101 | = |
| X0011110 | ≡ |
| X0011111 | BLANK |

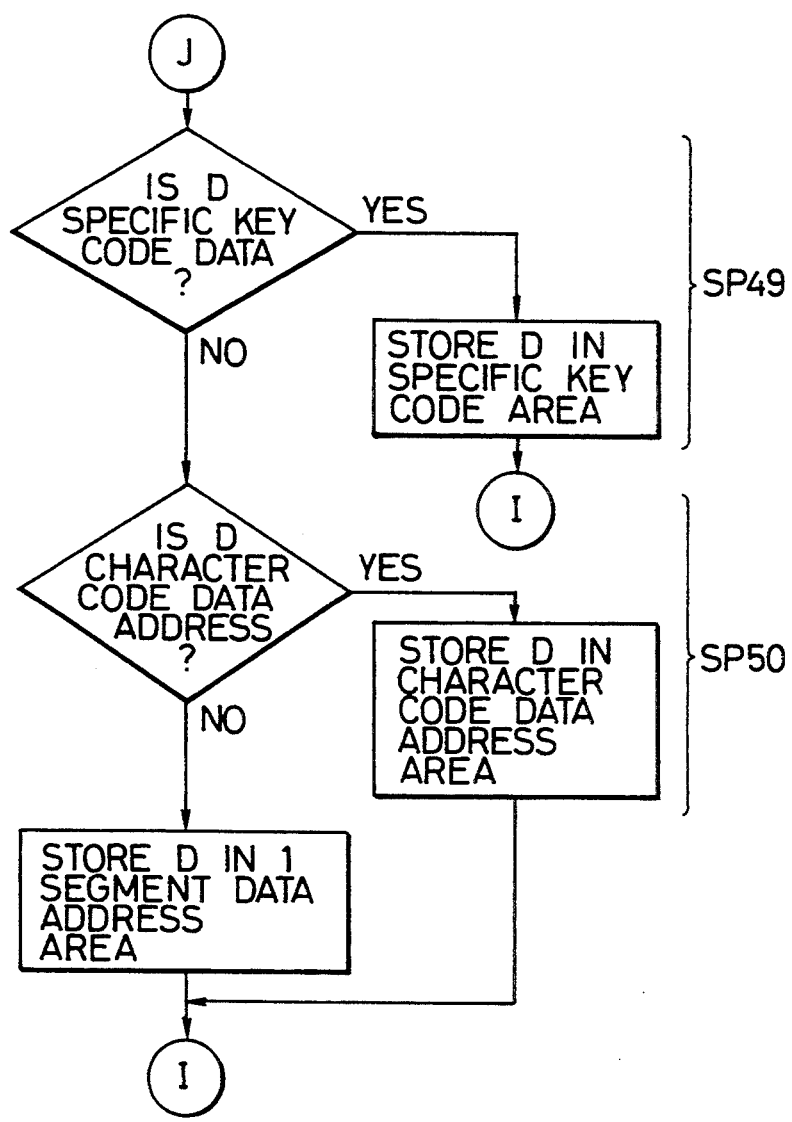

IMAGE PROCESSING APPARATUS HAVING DIAGNOSTIC MODE

This application is a continuation of application Ser. No. 07/866,278, filed Apr. 13, 1992, now abandoned, which is a continuation of application Ser. No. 07/570,972, filed Aug. 22, 1990, now abandoned, which is a continuation of application Ser. No. 07/257,157, filed Oct. 12, 1988, now abandoned, which is a continuation of application Ser. No. 06/767,196, filed Aug. 19, 1985, now abandoned, which is a continuation of application Ser. No. 06/396,463, filed Jul. 8, 1982, now abandoned.

BACKGROUND OF THE INVENTION

1. Field of the Invention

The present invention relates to an information processing method and apparatus therefor, for processing information of key input and of display and particularly adapted for use for example in a copier.

2. Description of the Prior Art

Microcomputers are employed in copiers and various electronic appliances for achieving complicated control in response to various input information. Usually input data are entered through input keys and the processed data are indicated by display units composed for example of light-emitting diodes. Conventionally hardware elements connected to a master computer (CPU) have been employed for processing or controlling such key input and data display. However such hardware elements cannot be designed to incorporate many functions because of the cost and complexity required, and a computer of a large capacity will be required if a part of such functions has to be borne by the master computer.

Also a conventional key input identifying device, utilized for identifying the actuated one among plural keys and transmitting the corresponding key signal to the computer, performs said identification by scanning all the keys connected to said device. For example in a copier, such key input identifying device is usually connected to numeral keys, a copy start key, a stop key, a paper-feed selector key etc., and the master computer is always called in response to the actuation of any key. In a copier it is desirable to accept only the stop key signal during a copying operation, but in practice a demand for key identification is given to the master computer in response to any key actuation. For this reason the master computer has to execute a program for identifying whether the stop key has been actuated whenever a key is actuated. In addition to the necessity for such key input identifying program, the master computer wastes considerable time for such identification in case other keys are actuated many times, and such time loss is a serious problem in case the master computer has to perform high-speed data processing.

In order to alleviate the burden of the microcomputers, there have been developed and made commercially available so-called key-and-display elements or devices for simplifying the procedure of key inputs and displays. Such key-and-display element is used for transmitting the actuated key to the microcomputer, and converting the data for preset or completed copy number into display signals for providing corresponding display.

The key-and-display element is generally unable to function alone but is designed to be controlled by a microcomputer. Consequently data transmission is required between the master computer and the key-and-display element in order to identify the proper function of the key matrix or the display circuit. The program required in the master computer for this purpose requires additional labor for preparation and additional memory.

SUMMARY OF THE INVENTION

The object of the present invention is to provide an information processing method not associated with the above-mentioned drawbacks and an apparatus therefor.

Another object of the present invention is to provide an improvement on the key input and display method and apparatus adapted for use in a copier or a printer.

Still another object of the present invention is to provide an information processing apparatus capable of secure information processing for key input and display through inexpensive means, without the use of a master computer of a large capacity.

Still another object of the present invention is to provide an information processing apparatus capable of independently identifying the key input and display status without going through the master computer.

Still another object of the present invention is to provide an information processing apparatus capable of identifying the key input and display status even during the operation of a copier or the like.

Still another object of the present invention is to provide an information processing apparatus capable of identifying the key input or display status without access to the master computer.

Still another object of the present invention is to provide an information processing apparatus capable of exactly transmitting key signals to the master computer.

Still another object of the present invention is to provide an information processing apparatus allowing easy judgement of the result of key input identification.

Still another object of the present invention is to provide an information processing apparatus capable of identifying the key input through simple means without an interruption procedure in the master computer.

Still another object of the present invention is to provide an information processing apparatus allowing the access to the master computer only in response to the actuation of a particular key, wherein said particular key is arbitrarily selectable.

The foregoing and still other objects of the present invention will become fully apparent from the following description of the preferred embodiments.

BRIEF DESCRIPTION OF THE DRAWINGS

FIGS. 5A and 5B are explanatory charts showing the relationship between character codes and characters; and FIGS. 6A to 6I are flow charts showing the control procedures.

DESCRIPTION OF THE PREFERRED EMBODIMENTS

Now the present invention will be clarified in detail by the following description of an embodiment to be taken in conjunction with the attached drawings.

Figure 1:
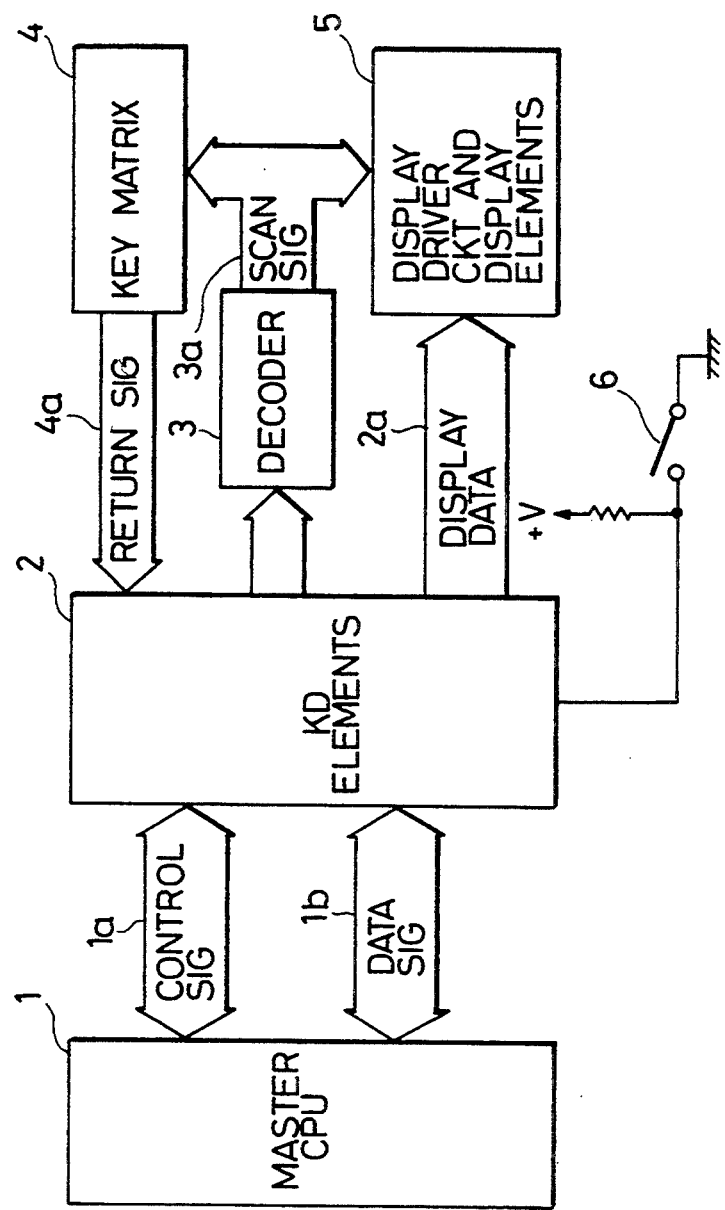
FIG. 1 is a block diagram of a control unit embodying the present invention, involving a key input unit and a display control element.
Figure 3:
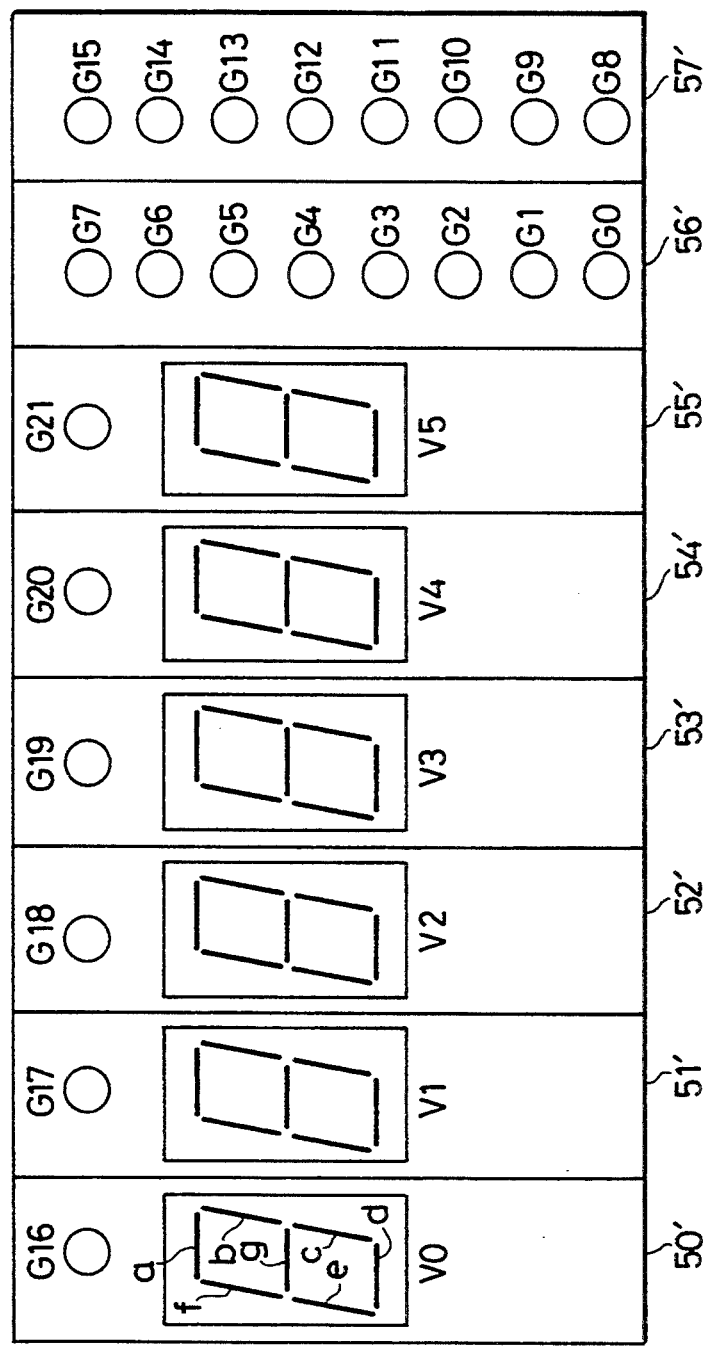
FIG. 3 is a schematic view showing the arrangement of display elements.

Referring to FIG. 1, a master processor or master CPU 1 performs sequence control for copying operation in response to the signals from a key matrix 4 as will be explained later, and displays the completed copy number on display elements 5 in case of a multiple copying. Said master processor 1 is connected with a key-and-display control element (KD element) 2 through a control signal line 1a and a data signal line 1b through which display signals and key signals are transmitted. A decoder circuit 3 for decoding the multiplex signals is provided for reducing the number of signal lines of said KD element 2, but may be dispensed with if the KD element 2 has a sufficient number of signal lines. The KD element 2 emits scanning signals 3a at a determined interval for conducting dynamic scanning of the key matrix 4 thereby identifying the actuated key and dynamically driving a display driver circuit and display elements 5 to activate said elements. The key matrix 4 is linked, for example in a copier, with numeral keys for entering a desired copy number, a copy key for starting the copying operation, a stop key for interrupting a multiple copying operation, a paper-feed selector key for selecting one of paper-feed trays etc. provided on a control panel. The display elements 5 include, as shown in FIG. 3, six 7-segment display units, of which V0 V2 are utilized for indicating the present copy number while V3 to V5 are utilized for indicating the completed copy number. There are also provided 1-segment display units G0-G21 for indicating various states of the apparatus such as the absence of paper, absence of toner, warm-up time, paper jamming, stopped state, selected tray etc.

The scanning signals 3a supplied to the key matrix 4 are returned therefrom as return signals 4a to the KD element 2 for identifying the key input.

The display driver circuit and display elements 5 perform dynamic display in response to said scanning signals 3a and display signals 2a released by the KD element 2 in synchronization with said scanning signals 3a.

A switch 6 provides, when closed, an instruction signal to the KD element 2 for effecting independent identification of the key input and display status.

Figure 2:
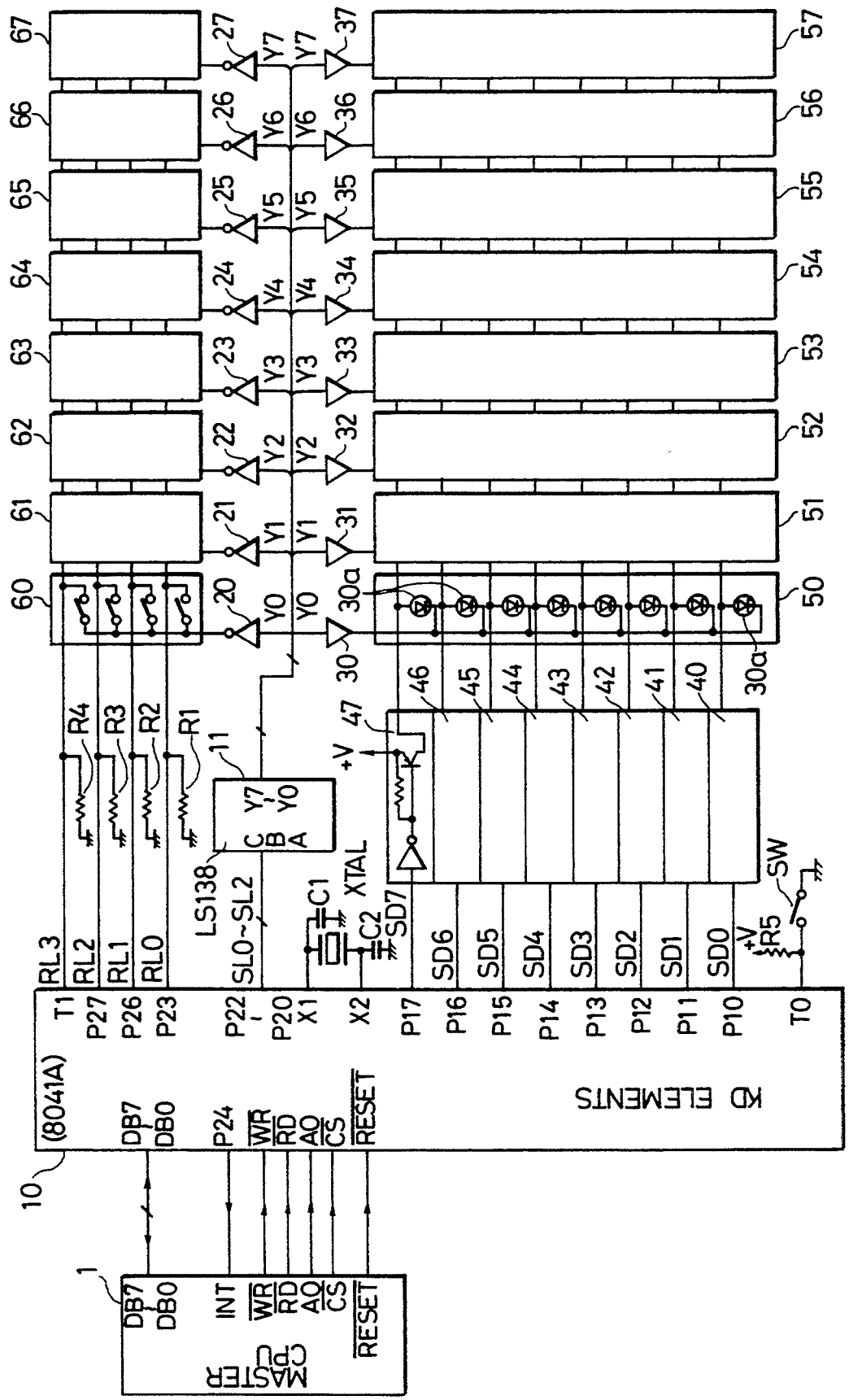
FIG. 2 is a detailed block diagram of the circuit shown in FIG. 1.

The circuits shown in FIG. 1 are shown in detail in FIG. 2, wherein a KD element 10, corresponding to the KD element 2 in FIG. 1, is composed in the present embodiment of a one-chip microcomputer 8041A for peripheral control supplied by Intel Corp. in order to achieve software control for key input and display. Said microcomputer 8041A, capable of 8-bit parallel data processing, is provided with a read-only memory of 1 kilobyte, a random access memory of 64 bytes, 16 general-purpose input/output ports, 2 input ports T0, T1 and T2 input/output data bus buffers for facilitating the use as a slave computer. It also has data bus signals and control signals for data transmission with the master CPU 1 and can be easily connected for example with the microcomputer 8080A or 8085A supplied by Intel Corp. Further details of the microcomputer 8041A are available from the users' manual of Intel.

A crystal oscillator XTAL is connected, in combination with condensers C1, C2, to oscillating ports X1, X2 of the KD element 10 for generating clock signals as the control clock signals and the timer signals for the KD element 10. Data bus signals DB0-DB7 are supplied to or released from said data bus buffers in response to control signals to be explained later. An interruption demand signal P24, advising the presence of a key input to the master CPU 1, is turned on or off according to the content of an internal buffer DBBOUT upon execution of an enable flag instruction ENFLG in the KD element 10. There are also provided control signal input ports for receiving a write-in signal $\overline{WR}$, a read-out signal $\overline{RD}$, an address signal A0, a chip select signal $\overline{CS}$, and a reset signal $\overline{RESET}$ from the master CPU 1.

Ports P20-P22 are allotted for scanning signals SL0-SL2, releasing numerical signals 0-7 in cyclic manner at an interval determined by the oscillating frequency of the oscillator XTAL and the internal timer of the KD element 10. Said signals SL0-SL2 are supplied to a decoder circuit 11, corresponding to the circuit 3 in FIG. 1 and composed for example of a 3-to-8 decoder element 74LS138 supplied by Texas Instruments Corp. for conversion into 8-bit parallel signals Y0-Y7. Said signals are supplied to inverter-drivers 20-27 and drivers 30-37 for effecting key scanning and dynamic drive of the display elements. The output signals of said inverter-drivers 20-27 are supplied to key switches 60-67, of which return signals RL0-RL3 are supplied, through pull-down resistors R1-R4, to ports P23, P26, P27 and Ti of the KD element 10. In the present embodiment said signals RL0-RL3 assume the high-level state when the corresponding key switches are actuated.

Ports P10-P17 of the KD element 10 provide display signals SD0-SD7 for driving the display elements 50-57 through drivers 40-47. In the present embodiment a display element 30a is lighted when a corresponding driver 30-37 is selected by the low-level state of a corresponding signal Yn and a corresponding driver 40-47 is selected by the high-level state of a corresponding signal SDn.

Figure 4:
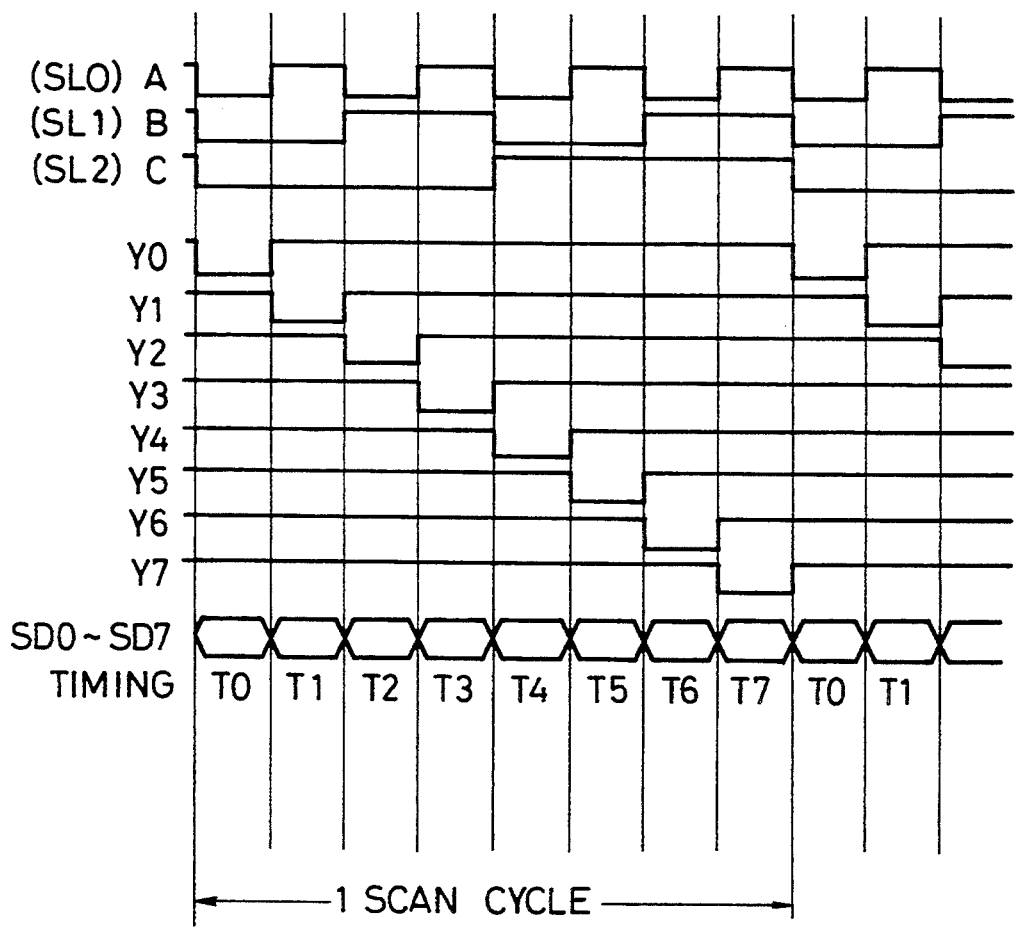
FIG. 4 is a timing chart of signals for dynamic display drive.

FIG. 4 shows the timings of the signals SL0-SL2, Y0-Y7 and SD0-SD7, wherein the signals SL0-SL2 are frequency divided in succession to obtain dynamic scanning signals Y0-Y7. Each of symbols T0-T7 represents the period of a scanning cycle in which each of the signals Y0-Y7 is selected.

The present embodiment is capable of scanning a 4×8 key matrix and of driving six 7-segment light-emitting diode display units and twenty-two 1-segment light-emitting diode display units. FIG. 3 illustrates an example of the arrangement of the display elements 50-57, wherein blocks 50'-57' respectively correspond to the display element blocks 50-57 in FIG. 2. The blocks 50'-55' are composed of 7-segment light-emitting diode (LED) display units V0-V5 and 1-segment LED display units G16-G21, wherein segments a-g of said 7-segment LED units V0-V5 are driven by the signals SD0-SD6, while said 1-segment LED units G16-G21 are driven by the signal SD7. Also the 1-segment LED units G0-G15 in the blocks 56' and 57' are driven respectively by the signals SD0-SD7. Said 7-segment LED units and 1-segment LED units are independently drivable. Also collective extinguishing or clearing is possible for the group of 7-segment LED units V0-V5, the group (A) of the 1-segment LED units G0-G7, the group (B) of the 1-segment LED units G8-G15, and the group (C) of the 1-segment LED units G16-G21.

A check switch SW, corresponding to the switch 6 in FIG. 1, cooperates a pull-up resistor R5 and selects a mode for identifying the key input and display status in the opened state of said switch, or a normal function mode in the closed state. The signal from said check switch SW is supplied to an input port T0 of the KD element 10, wherein internal instruction JT0 and JTN0 are executed to identify the state of said port T0 through software.

Now there will be given an explanation on the data transmission between the master CPU 1 and the KD element 10.

The master CPU 1 transmits the data through the data bus lines DB0–DB7 in response to the signals, $\overline{WR}$, $\overline{RD}$, $\overline{CS}$ and A0, utilizing the software identification of the address signal A0 set as a flag F1 in the KD element 10 at the signal read-out or write-in. The transmission and identification of the data are conducted according to the external interruption routines to be explained later.

The KD element 10 provides the master CPU 1 with:

(1) signals "0, 0, 0, S, S, S, R, R" through the signals lines DB0–DB7 when the data bus buffer DBBOUT is read at the address signal A0 ="0" (key input signal write-in mode), wherein R represents the signals RL0–RL3 and S represents the signals Y0–R7; or (2) signals "X, X, X, X, F, S, IBF, OBF" when the data bus buffer DBBOUT is read at the address signal A0="1" (status word write-in mode), wherein F represents the flag F1, S at "1" represents a particular key mode to be explained later, IBF at "1" indicates that an input data bus buffer DBBIN is full, and OBF at "1" indicates that the output data bus buffer DBBOUT is full for suspending the data transmission from the master CPU.

Also the master CPU 1 provides the KD element 10 with:

(3) 8-bit signals "*0XCCCCC" in the 7-segment data set mode at the address signal A0="0", wherein "*" represents a display with or without blinking respectively at "1" or "0", C is a number from 0 to 31 representing 7-segment character code, and X may assume "0" or "1";

(4) signals "*1XXXXXX" in the 1-segment data set mode at the address signal A0="0", wherein the first bit "*" represents a display with or without blinking respectively at "1" or "0", the last bit "*" represents "ON" or "OFF" respectively at "1" or "0", and X may assume "0" or "1";

(5) signals "1AAAAA" in the data address set mode at the address signal A0="1", wherein A is a number from 0 to 5 representing a 7-segment data address when the bits "" are "00", or a number from 0 to 31 representing a particular key code when said bits "" are "01", or a number from 0–21 representing a 1-segment data address when said bits "" are "10", or a number from 0 to 31 representing a particular key code when said bits "**" are "11", in which the number 31 corresponds to "AAAAA"; or (6) signals "0XNSCBAV" in the command set mode at the address signal A0="1", wherein N represents a normal key mode to be explained later, S represents selecting the particular key mode, C indicates clearing the 1-segment unit group (C), B indicates clearing the 1-segment unit group (B), A indicates clearing the 1-segment unit group (A), V indicates clearing the 7-segment unit group, and X may assume "0" or "1".

FIGS. 5A and 5B show the relationship between the character codes and the characters to be displayed by the 7-segment LED units V0–V5.

Now reference is made to the flow charts in FIG. 6 indicating the control procedure in the present invention. The following table shows the memory map in the random access memory of 64 bytes provided in the KD element 10, composed of the processor 8041A as explained in the foregoing.

| Address | Name | Function |
| --- | --- | --- |
| 0–7 | Register bank 0 | Register for normal processing |
| 8–23 | Stack area | RAM for stack |
| 24–31 | Register bank 1 | Register for interruption processing |
| 32–39 | Display RAM | Store data to be supplied to port 1 in T0–T7 |
| 40–45 | Character code data | MSB = blinking; bits 0–4 = character code |
| 46 | Group A on-off data | Store on-off data for G0–G7 |
| 47 | Group A blink data | Store blink data for G0–G7 |
| 48 | Group B on-off data | Store on-off data for G8–G15 |
| 49 | Group B blink data | Store blink data for G8–G15 |
| 50 | Group C on-off data | Store on-off data for G16–G21 |
| 51 | Group C blink data | Store blink data for G16–G21 |
| 52 | Character code data address | Store address for character code data |
| 53 | 1-segment data address | Store bit address for G0–G21 |
| 54 | Particular key code | Store particular key code |
| 55 | Scanning counter | Counter for storing timings of T0–T7 |
| 56 | Blink counter | Counter for timing of blinking display |
| 57 | Key buffer | Temporary storage of key input data |
| 58 | Key data | Storage of key data |
| 59 | Key counter | Store number of keys actuated in one scanning cycle |
| 60 | Key coincidence counter | Store number of scanning cycles in which a same key is consecutively actuated |
| 61 | Self-check mode | Store self-check mode |

Figure 6A:
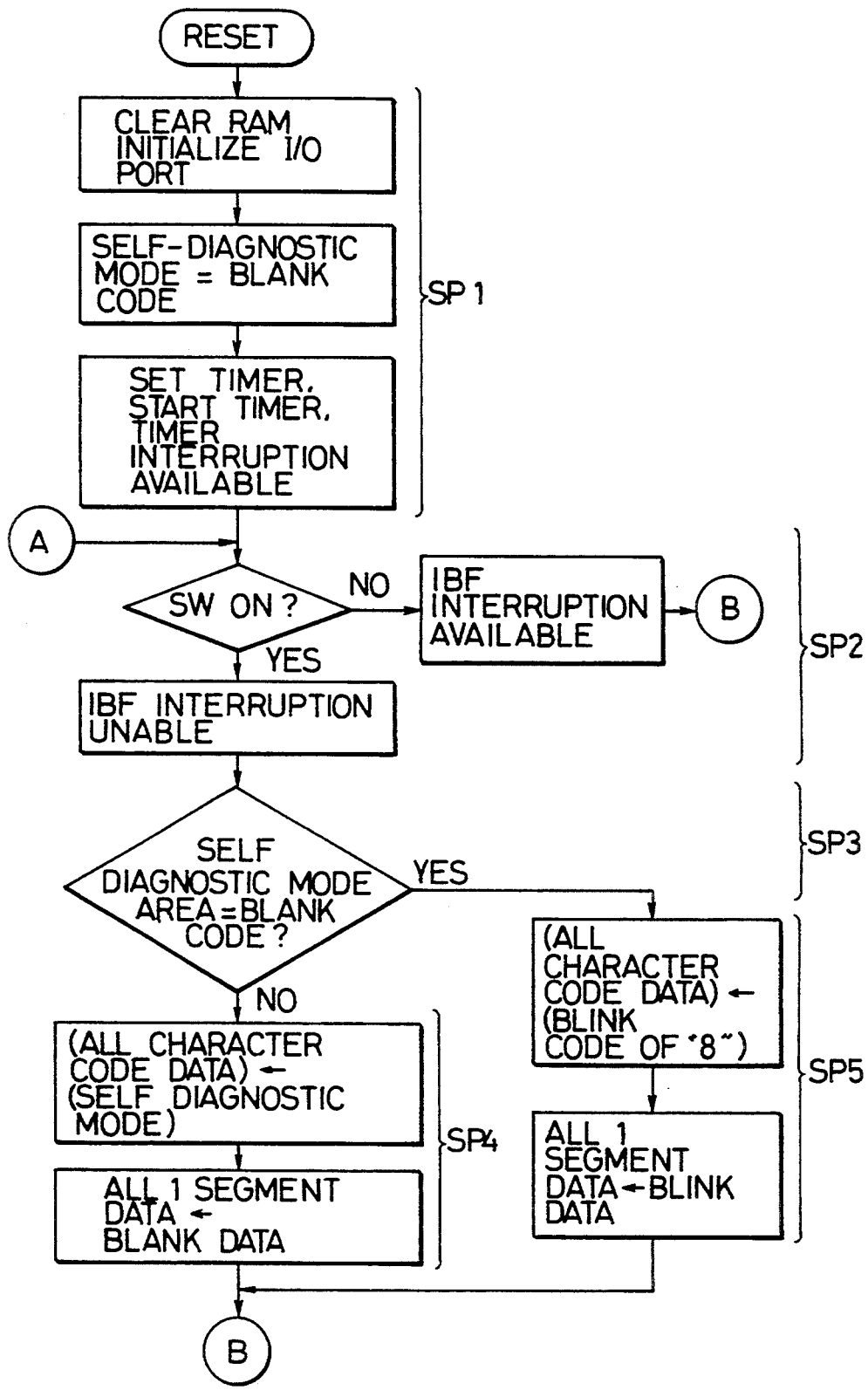

In the flow chart shown in FIG. 6A, the step SP1 is executed in response to the entry of a reset signal to the port $\overline{RESET}$ of the KD element 10 to clear the random access memory, to effect the initialization of input-output ports and to set a timer thereby enabling the interruption procedure. The timer interruption procedure is accepted at determined intervals, at each of T0–T7 shown in FIG. 4, since the timer is set at the step SP22 of the interruption program to be explained later.

Figure 6B:
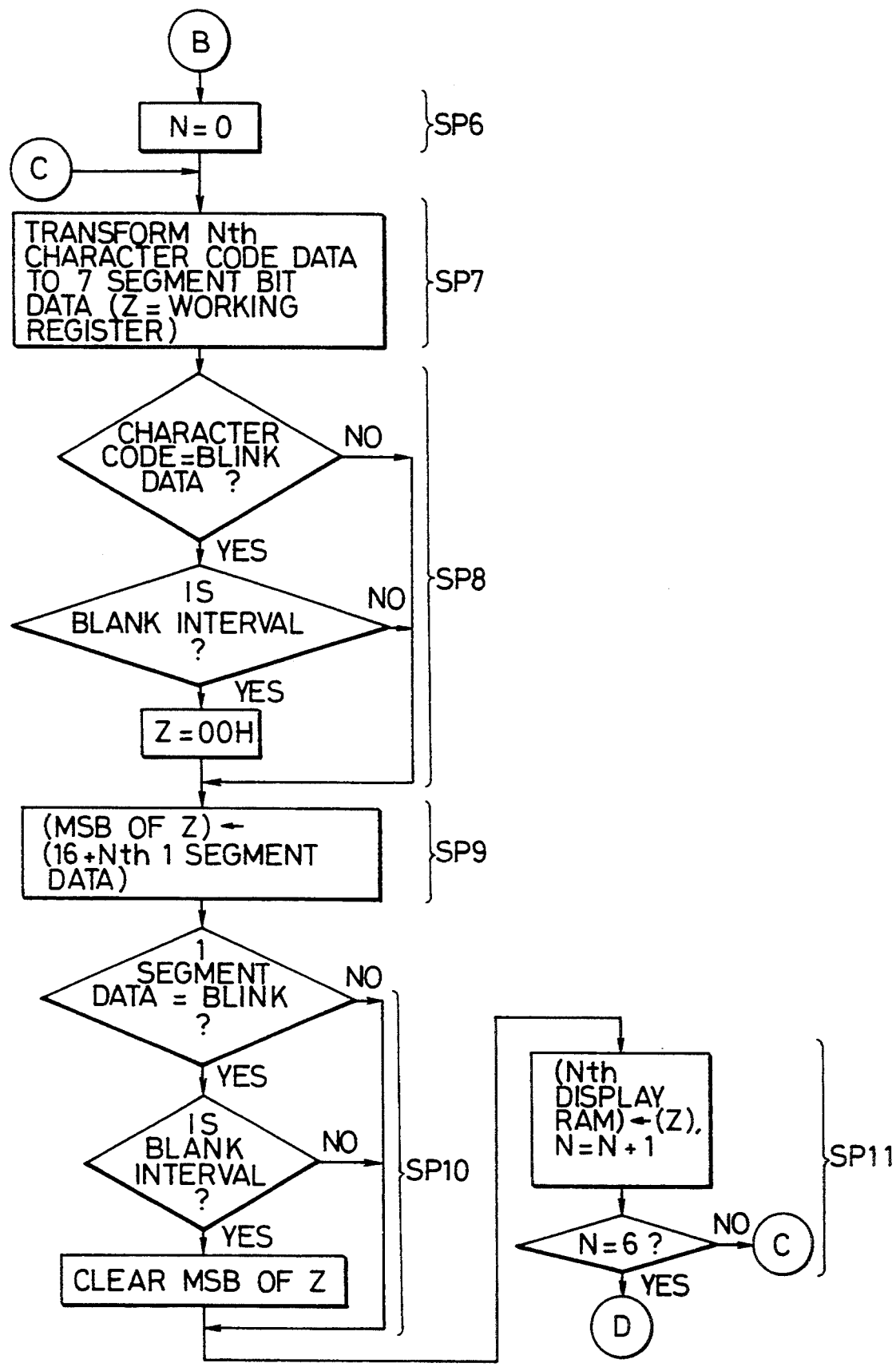
Figure 6C:
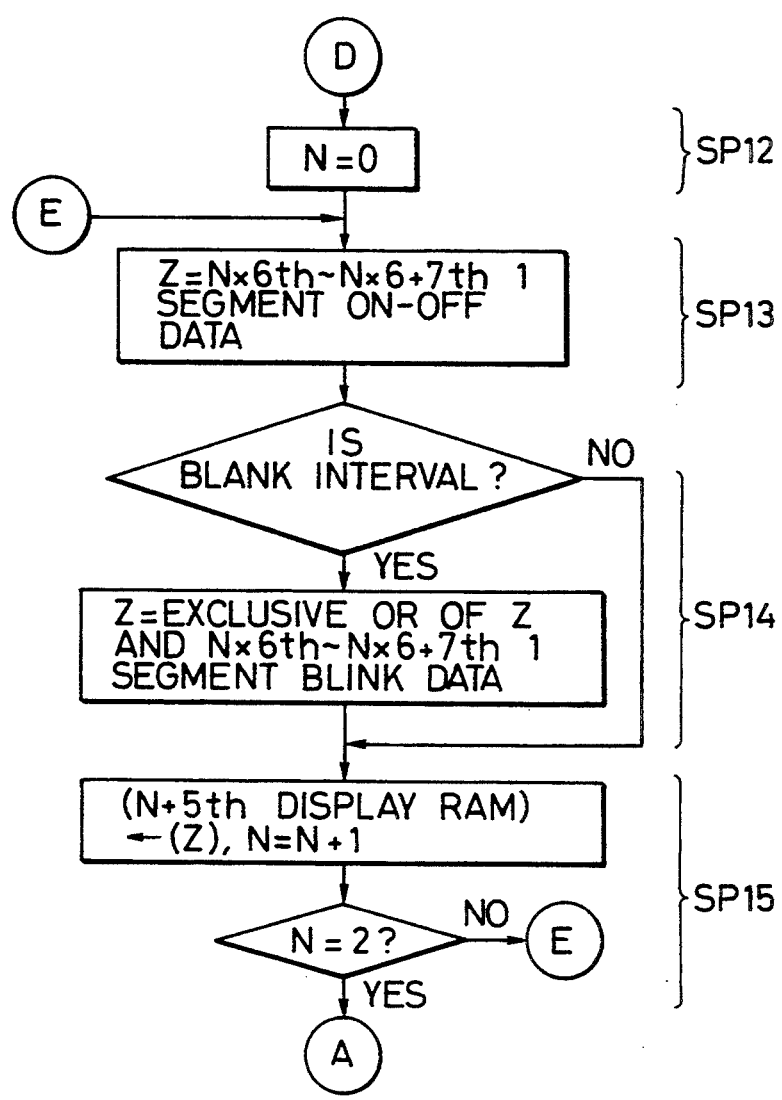

The steps SP2–SP15 in FIGS. 6A–6C, constituting a loop, perform the conversion of 7-segment character codes into 7-segment data, data processing for blinking display and a part of self-check program for key input and display.

The step SP2 identifies, according to the status of the check switch SW, whether to proceed to the normal function or to the check procedure. In case the check switch is closed, the interruption for "input buffer full", to be explained later, is disabled and the program enters the self-check mode in which all the data transmissions from the master CPU 1 are disregarded. In this manner it is made possible to prevent erroneous operation caused by the eventual noises in the data bus or in the control signal line during the independent check procedure without the use of the master CPU 1. Consequently the check can be effected even when the master CPU is not available or is engaged in another job.

In case the check switch SW is turned off, the aforementioned interruption for "input buffer full" is enabled, and the data reception from the master CPU 1 is also enabled.

It is nevertheless possible also to enable the display check regardless of the key input.

The step SP3 identifies the status of the self-check mode stored in the random access memory, and the program proceeds to the step SP5 in case said mode is represented by a blank code (extinguishing code), or to the step SP4 in other cases. The self-check mode is represented by a blinking code "8" or by a numeral code corresponding to an actuated key. During the actuation of a key the step SP4 is executed to provide display corresponding to the key code (cf. FIG. 5) by the 7-segment LED display units, and upon termination of said actuation, display returns to a state indicating the check mode in progress. However in case the self-check mode is represented by a code "31" corresponding to the blank code for zero suppression in numeral display, the step SP5 is executed for selecting a display check mode. In said step SP5, the 7-segment units V0–V5 display blinking "8", and the 1-segment units G0–G21 are lighted in blinking mode to check the display units. Also in a state other than the display check mode without the key actuation, the 7-segment units V0–V5 display blinking "8" while the 1-segment units G0–G21 are turned off, thereby indicating that the self-check procedure is in progress. At the resetting, the self-check mode is in the display check mode by the step SP1, so that the key check is effected after the display check. In the aforementioned manner the KD element 10 can independently identify the key inputs and the status of display, thus allowing to easily locate the failures in the circuits or to confirm the functions thereof.

The step SP6 resets a counter N for loop processing of the steps SP7–SP11 for setting the display data to be supplied to the display blocks 50'–55'.

The step SP7 converts the character code data of a display digit indicated by said counter N into 7-segment bit data. The symbol Z indicates a working register.

The step SP8 identifies if the character code is blinking data, and if it is in a blank interval determined by the blinking counter, and, if so, resets the character code data Z.

The step SP9 sets the data for the LED G16–G21 indicated by the counter N in the most significant bit of the register Z, and the step SP10 performs a similar processing for blinking display. The step SP11 stores the content of the register Z into the random access memory for the N-th display, and the steps SP7–SP11 are repeated until N reaches 6.

Through said steps SP6–SP11 the display data to be supplied to the display blocks 50'–55' shown in FIG. 3 are stored in the random access memory, in response to key signals or signals from the master CPU 1, representing key codes, preset copy number or completed copy number.

The steps SP12–SP15 set the display data to be supplied to the display blocks 56' and 57' in FIG. 3 for indicating the status of the apparatus. Said data are set upon detection of an abnormality, such as the absence of copy sheets, by the master CPU, or in correspondence to the blink code in the check mode.

The step SP12 initializes the loop counter N. The step SP13 sets the display data Z, then the step SP14 performs a similar processing for the blinking display, and the step SP15 stores the data Z into the random access memory for display. Said steps SP13–SP15 are repeated until N reaches 2.

In this manner the use of interruptable programs for the data conversion for the random access memory for display allows to reduce the number of interruption programs and to reduce the processing time required for data write-in from the master CPU 1.

Figures 6D, 6E:
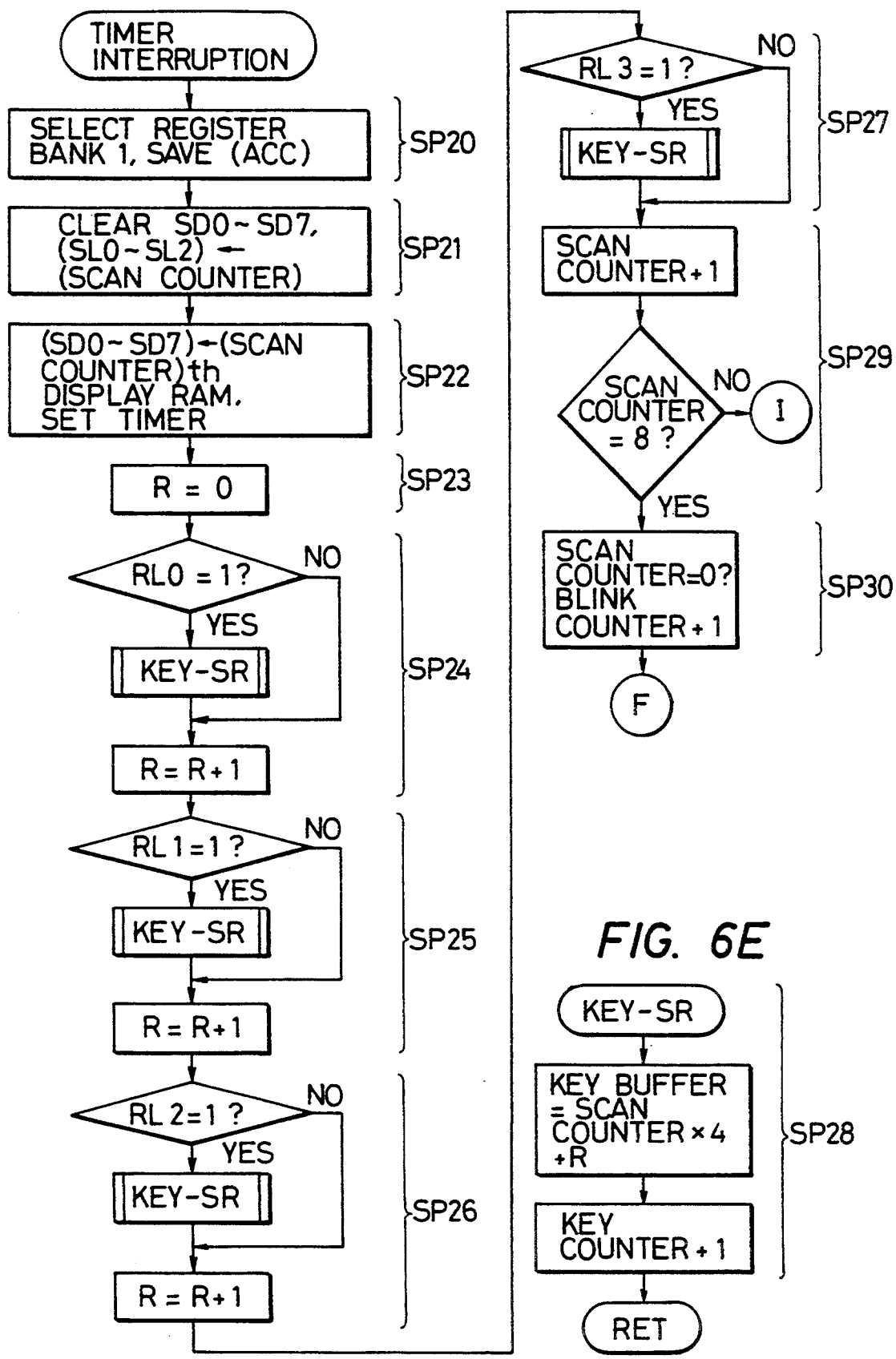
Figure 6F:
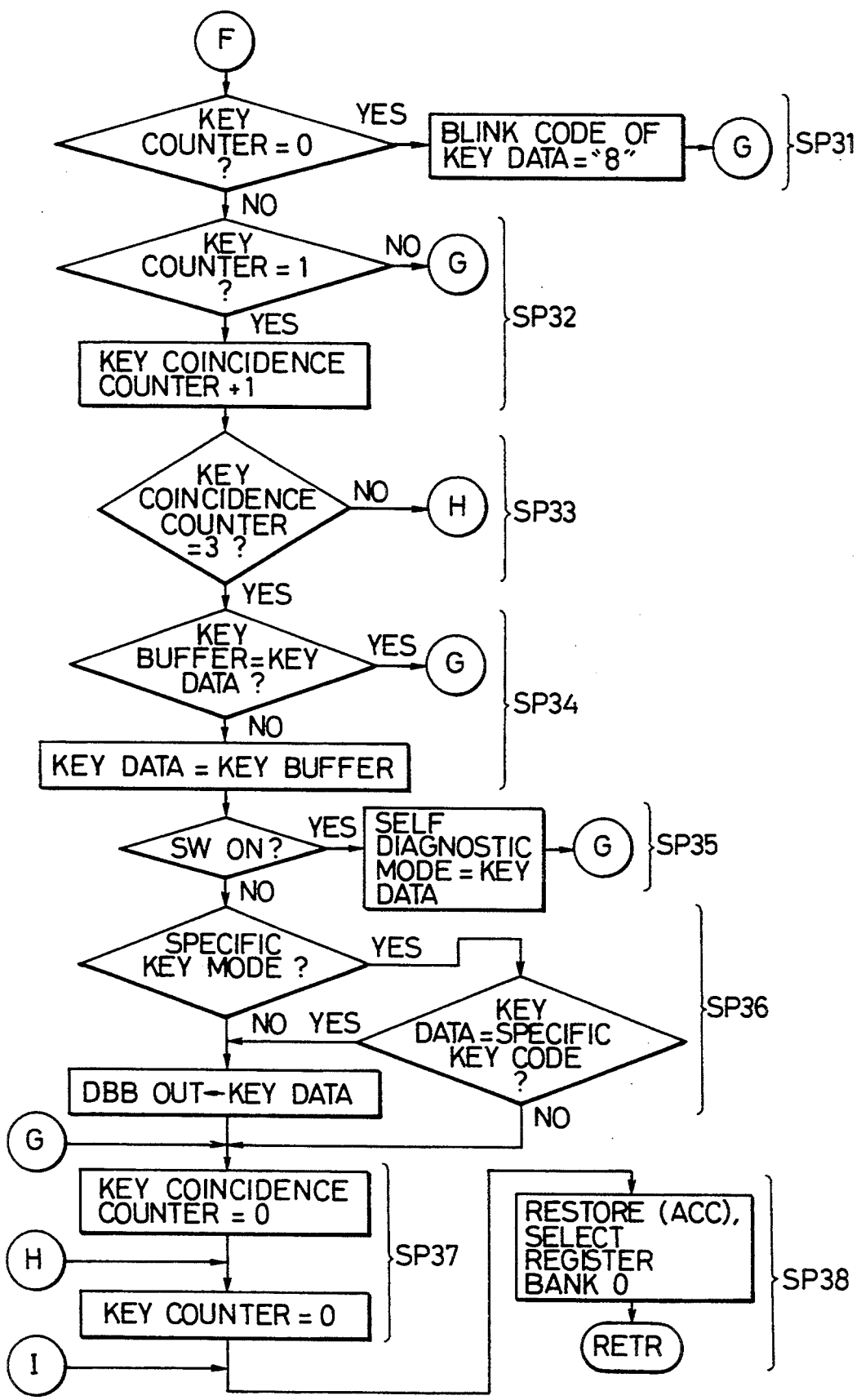

Now reference is made to FIGS. 6D–6F for explaining the timer interruption routines for RAM data display and key entry.

In FIG. 6D, in response to a timer interruption, the step SP20 is executed to change the register bank to "1" and to divert the content of an accumulator ACC. Then the step SP21 clears the display data signal lines SD0–SD7 and sets the signal lines SL0–SL2, thereby preparing said signal lines SD0–SD7 for the subsequent signal output. The step SP22 releases the content of the display RAM, corresponding to the content of the scanning counter, to said signal lines SD0–SD7, and sets the timer as preparation for the subsequent timer interruption.

The step SP24 initializes a counter R for the key check in the steps SP24–SP27.

The step SP24 also identifies the return signal RL0, and, if RL0=1 indicating a key actuation, the step SP28 executes a sub-routine KEY-SR. Also said step SP28 adds the content of the scanning counter multiplied by four to the counter R, and stores the result into a key buffer. Consequently the key buffer stores a binary number "000SSSRR" wherein "SSS" indicates the content of the scanning counter, and "RR" indicates the content of the counter R.

Said stored data are used as the data for the actuated key. The step SP28 also increases the content of the key counter by one, thus memorizing the number of actuated keys in a scanning cycle.

The step SP25 increases the content of the counter R by one to check the return signal RL1 in a similar manner as in the SP24. Thereafter the return signals RL2 and RL3 are similarly checked in the steps SP26 and SP27.

Then the step SP29 increases the content of the scanning counter by one to identify if the scanning cycle is completed, and the program proceeds to the step SP30 if said cycle is completed, or to the step SP31 if said cycle is not yet completed. The interruption procedure is completed in this manner.

The step SP30 initializes the scanning counter and adds one to the blinking counter for measuring the blinking interval.

The succeeding steps SP31–SP37 identify the presence of a key entry when:
 (1) only one key is actuated; and
 (2) a key is actuated at least over three scanning cycles.

In case a key is actuated continuously for a prolonged period, the first identification for key entry alone is made effective, in order to avoid multiple interruptions to the master CPU 1 for a single continuous key actuation.

The step SP31 identifies the content of the key counter, and sets the blink code "8" in the absence of key entry, thereby providing a blinking display "8" in the absence of key actuation in the self-check mode. This step is also utilized for inhibiting any succeeding key entry until all the keys of the control panel are once released, thereby preventing multiple interruptions to the master CPU resulting from a single continuous key actuation as explained above.

The succeeding step SP32 identifies if the content of the key counter is "1", and, if so, advances the key coincidence counter by one.

The succeeding step SP33 identifies the content of the key coincidence counter, in order to see if a same key is actuated over three scanning cycles. If this is the case, the program proceeds to the step SP34 to compare the content of the key buffer representing the present key with that of the key data representing the preceding key. If a continued actuation of a same key is identified, the content of the key buffer is disregarded and the program proceeds to the step SP37. If not, the key data are made equal to the content of the key buffer, and the program proceeds to the step SP35.

The step SP35 identifies the state of the check switch SW, and, if it is closed, employs the data of the self-check mode area as the key data. In case said switch is open, the step SP36 is executed to identify if the key data represent the particular key mode, and, if so, identify if the key data are equal to the particular key code. The particular key code is determined in advance by the master CPU, for example corresponding to the stop key. Such particular key code can be arbitrarily changeable and may be selected for plural keys. Then the step SP36 identifies a flag set in the step SP49 to be explained later. If said identification is affirmative, the content of the key data is transferred to the data bus buffer DBBOUT, and an input interruption command signal is supplied to the interruption port of the master CPU 1. For this purpose the KD element 10 executes the enable flag demand and provides data to the output data bus buffer DBBOUT thereby setting, in a hardware manner, said interruption demand signal P24, which is reset upon data reception of the master CPU 1 from said buffer DBBOUT. In this manner the key entry from the stop key alone is enabled during the copying operation.

The step SP37 initializes the key coincidence counter and the key counter for preparing for the succeeding key entry.

The step SP38, for completing the interruption procedure, restores the content of the accumulator ACC and resets the register bank, whereby the program returns to the ordinary routine executed when the interruption is demanded.

Figure 6G:
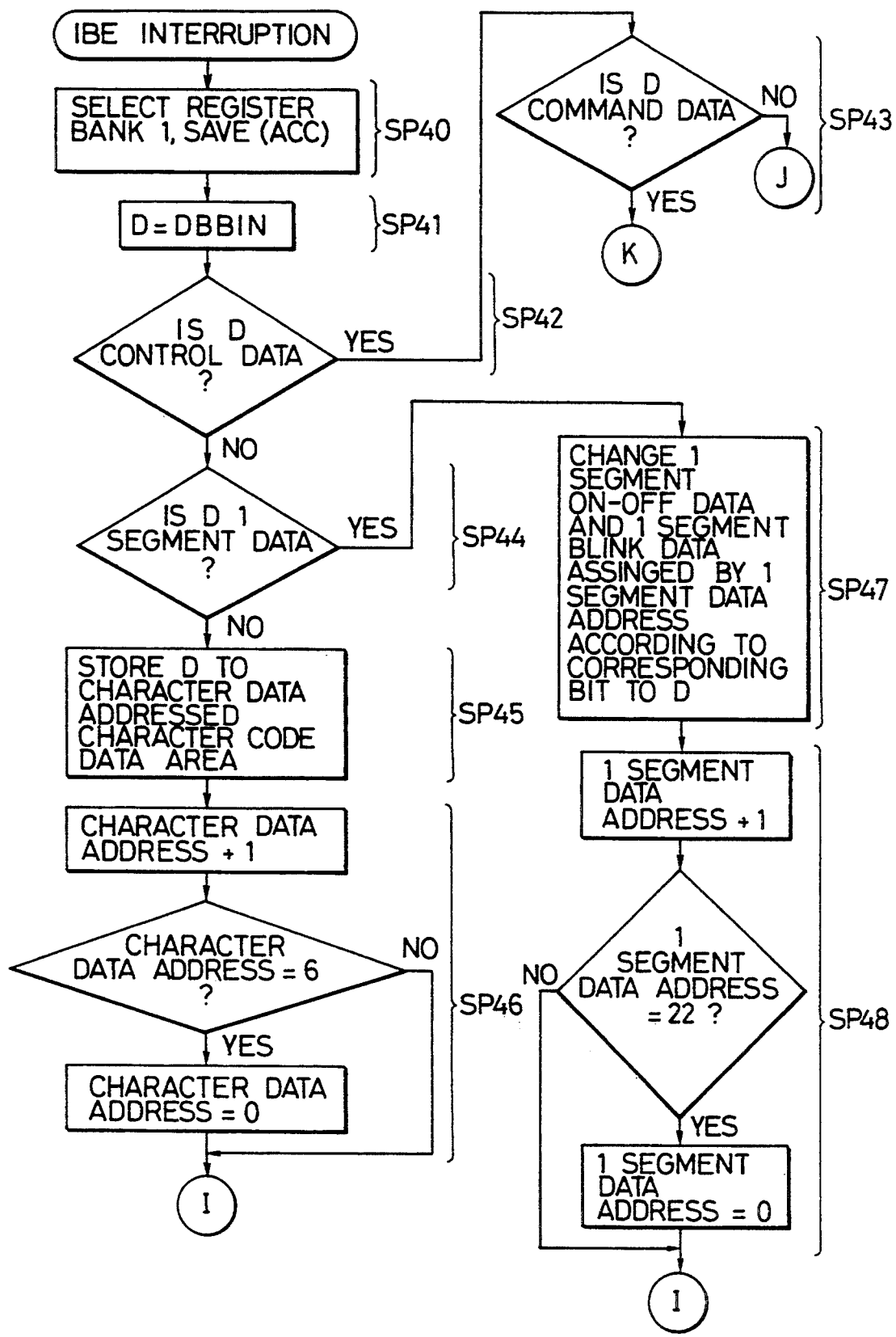
Figure 61:
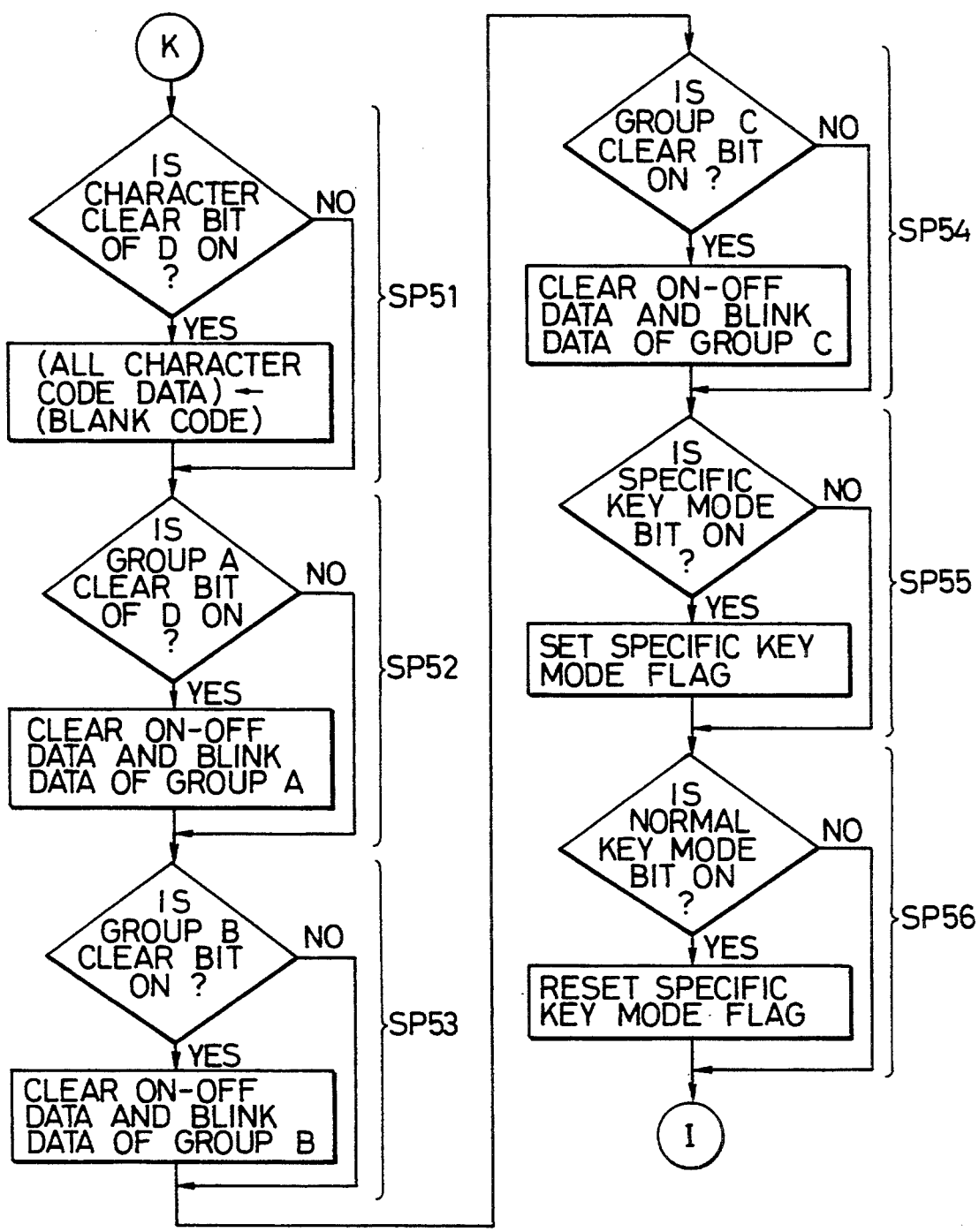

Now reference is made to FIGS. 6G–6I for explaining the IBF (input buffer full) interruption routine.

The IBF interruption is an external interruption taking place in case of data write-in to the input data bus buffer DBBIN of the KD element 10 from the master CPU 1, and is inhibited during the self-check procedure as explained in the foregoing.

In response to the IBF interruption demand signal, the step SP40 is executed to change the register bank to "1" and to divert the content of the accumulator ACC. Then the step SP41 reads the content D of said buffer DBBIN, and the program branches to various routines from the steps SP42, SP43 and SP44 according to said content D and the content of the address signal AO.

In case said content D is character data, the program proceeds to the step SP45 for storing said content D in a character code data RAM indicated by the character data address.

Subsequently the content of the character data address is advanced by one, and the step S46 is executed to identify if said content is equal to "6", and, if so, reset said address. Consequently, in case of consecutive input of character data into the KD element 10, said character data are in succession displayed by the 7-segment units in the order of V0–V1–V2–V3– . . . –V7–V0– . . . In case of jumped input of character data, for example V0–V4, address commands for selecting the character code addresses can be entered into the KD element 10. As explained above, the present embodiment facilitates the data input for display since the access to the addresses can be made in succession from the first address.

In case the aforementioned content D is 1-segment data, the steps SP47 and SP48 are similarly executed to set the 1-segment data and the 1-segment data address.

The succeeding step SP49 identifies if the content D is particular key code data, and, if so, stores said data in a particular key code area. In this manner it is rendered possible to select the particular key arbitrarily by software. In the present embodiment only one key, for example the stop key, is selected as the particular key, but the present invention is not limited to such case. For example the clear key for cancelling the data entered by the numeral keys, or the interrupt key for interrupting a copying operation in progress to enable another preferential copying operation and thereafter resuming the interrupted copying operation can also be selected as the particular key, and such selection can be made by dip switches or a program in the master computer. Also it is easily possible, by software, to increase the number of the particular key codes.

The step SP50 identifies the data D and stores said data D in the character code data address area or in the 1-segment data address area. In case the data D are command data, the steps SP51–SP56 are executed to perform processings, according to said D, in order to clear the display or to set flags for particular modes.

Said steps SP51–SP54 identify the clear bits of the 7-segment display group, 1-segment display group A, B and C, and clear the display data of each group in case the corresponding bit is on. These steps allow simplification of the program since the clearing data need not be set for each segment to be cleared.

The steps SP55 and SP56 identify the setting or resetting or particular key mode and correspondingly set or reset the particular key mode flag.

The bit for such particular key mode is set to "1" for example upon actuation of the copy button and is reset upon completion of a multiple copying operation, while the bit for the ordinary key mode is set to 0 and 1 in succession. Consequently the particular key alone can be entered during the copying operation but all keys can be entered during the stand-by state. Similarly the key mode bit can be controlled upon detection of sheet jamming in the apparatus.

The areas of the on-off data and blinking data in the steps SP52–SP54 correspond to those in the addresses 46–51 in the aforementioned random access memory. Also the character code data in the step SP51 correspond to the 6-byte data in the addresses 40–45.

What I claim is:

1. An image processing apparatus comprising:

key input means for setting an image formation mode;

display means for displaying the image formation mode set by said key input means for displaying an operation condition of said image processing apparatus and for performing a predetermined diagnostic display operation;

a first processor for discriminating data from said key input means and for outputting display data for operating said display means, said first processor being controlled on the basis of data from a second processor; and diagnostic instruction input means for inputting a diagnostic instruction for checking said key input means and said display means at an arbitrary timing after power on;

wherein said first processor discriminates whether the diagnostic instruction is inputted or not through said diagnostic instruction input means, wherein when said first processor discriminates that the diagnostic instruction is not input, said first processor is set to a normal operation mode in which image formation is enabled on the basis of the image formation mode set by said key input means, the data discriminated by said first processor is sent to said second processor, and said first processor outputs display data on the basis of data from said second processor, and wherein when said first processor discriminates that the diagnostic instruction is input, said first processor is set to a diagnosis mode in which data is prohibited from being sent to and received from said second processor, and said first processor first performs a display check operation by controlling said display means to execute the predetermined diagnostic display operation independent of an input of said key input means, and when data is entered from said key input means after performance of the display check operation, said first processor performs a key check operation by outputting, independent from said second processor, display data varied in accordance with a type of the data entered from said key input means.

2. An information processing apparatus according to claim 1, wherein said first processor is a slave computer, said data from said second processor is generated by a master computer, and said slave computer enables a check of said key input means or said display means independently from access to said master computer.

3. An information processing apparatus according to claim 2, wherein said master computer is for controlling a copier, and said slave computer enables said check, regardless of whether said copier is in copying operation or is in a stand-by state.

4. An information processing apparatus according to claim 1:

wherein said first processor responds to the initial input of said key input means in said normal operation mode, and causes said display means to display predetermined data in response to the continuous manual input of said key input means in said diagnosis mode.

5. An information processing apparatus according to claim 1, wherein said key input means includes numeral keys, said first processor displays a state determined by said diagnosis mode, and displays characters corresponding to the numeral keys during entry by the numeral keys in said diagnosis mode.

6. An apparatus according to claim 1, wherein said key input means includes a key for setting the image forming condition of the apparatus, and said display means displays a predetermined indication representing that a diagnosis mode is set by said diagnostic instruction input means.

7. An image processing apparatus comprising:

key input means for setting an image formation mode;

display means for displaying the image formation mode set by said key input means, for displaying an operation condition of said image processing apparatus and for performing a predetermined diagnostic display operation;

a slave processor for discriminating data from said key input means and for outputting display data for operating said display means;

diagnostic instruction input means for inputting a diagnostic instruction for checking said key input means and said display means at an arbitrary timing after power on; and a master processor for receiving the data discriminated by said slave processor and for performing a process for image formation on the basis of the discriminated data, said master processor controlling the output of display data by said slave processor;

wherein said slave processor discriminates whether the diagnostic instruction is inputted or not through said diagnostic instruction input means;

wherein when said slave processor discriminates that the diagnostic instruction is not input, said slave processor is set to a normal operation mode in which image formation is enabled on the basis of the image formation mode set by said key input means, said slave processor sends the discriminated data to said master processor, and said slave processor outputs display data on the basis of data from said master processor; and wherein when said slave processor discriminates that the diagnostic instruction is input, said slave processor is set to a diagnostic mode in which data is prohibited from being sent to and received from said master processor, and said slave processor first performs a display check operation by causing said display means to execute a predetermined diagnostic display operation independent of an input of said key input means, and when data is entered from said key input means after performance of the display check operation, said slave processor performs a key check operation by outputting, independent from said master processor, display data varied in accordance with a type of the data entered from said key input means.

8. An information processing apparatus according to claim 7, wherein said key input means has numeral keys for generating information data associated with an image forming condition, said display means has at least plural elements for numeral display and said slave processor designates in said diagnostic mode a predetermined character code corresponding to manual key input of the key input means excepting said numeral keys and to display said predetermined character code by the elements of said display means.

9. An information processing apparatus according to claim 7, wherein said slave processor is a slave computer which changes over from said operation mode thereof to said diagnostic mode for checking if said key input means and said display means are normal or not in response to an actuation of said diagnostic instruction input means, and checks in said diagnostic mode independently from data entry from said master processor.

10. An information processing apparatus according to claim 9, wherein said master processor is a master computer, and said slave computer enables in said diagnostic mode a check of said key input means and said display means independently from the access to said master computer.

11. An apparatus according to claim 7, wherein key input means includes a key for setting the image forming condition of the apparatus, and said display means displays a predetermined indication representing that a diagnostic mode is set by said diagnostic instruction input means.

* * * * *

UNITED STATES PATENT AND TRADEMARK OFFICE
CERTIFICATE OF CORRECTION

PATENT NO. : 5,444,846
DATED : August 22, 1995
INVENTOR(S) : NAO NAGASHIMA

It is certified that error appears in the above-indentified patent and that said Letters Patent is hereby corrected as shown below:

IN THE DRAWINGS

Sheet 11 of 13: "ASSINGED" should read --ASSIGNED--.

COLUMN 11

Line 53, "in" should read --in a--.
Line 56, "claim 1:" should read --Claim 1,--.

COLUMN 12

Line 54, "information" should read --image--.
Line 64, "information" should read --image--.

COLUMN 13

Line 5, "information" should read --image--.

Signed and Sealed this

Twenty-sixth Day of December, 1995

Attest:

BRUCE LEHMAN

*Attesting Officer*      *Commissioner of Patents and Trademarks*